Patented Apr. 29, 1930

1,756,549

UNITED STATES PATENT OFFICE

OSWALD H. HANSEN, OF CEDARBURG, WISCONSIN, ASSIGNOR TO HANSEN CANNING MACHINERY CORPORATION, OF CEDARBURG, WISCONSIN, A CORPORATION OF WISCONSIN

PROCESS OF STERILIZING FOOD

No Drawing.  Application filed June 15, 1929.  Serial No. 371,303.

The present invention relates generally to improvements in the art of heat treating certain classes of edible substances in order to preserve the same, by destroying bacteria and other destructive micro-organisms therein.

An object of the invention is to provide an improved process of effectively sterilizing certain classes of food products at a relatively rapid rate, and of maintaining the treated substances in sterile condition.

With the more recent development and introduction of high speed canning machinery and its resultant enormous capacity, the matter of effectively processing the vast output of the modern filling and closing machines, becomes a problem which demands careful consideration. In order to avoid restriction of the capacity of the canning factory as a unit, the sterilizing and other processing operations must keep pace with the speedy operation of the measuring, filling and closing mechanisms. The degree of sterilization of the product, must however be sufficient to insure complete destruction of all of the bacteria, and the treated substance must be subsequently packed in the containers under sterile conditions, in order to maintain the commodity free from spoilage at all times.

Certain classes of food products such as green peas, beans, and the like, are capable of resisting properly applied heating to an extent considerably beyond the sterilization temperature thereof, either in dry state or in the presence of liquid, without deteriorating the product. When such materials are properly heat treated in relatively dry condition, the heat penetration of each of the individual granules of a mass, will obviously be considerably more rapid and effective, than when the granules are immersed in a liquid.

In order to maintain the substance after having been heat treated in dry condition, properly sterilized, the product should be hermetically sealed in the final containers in a sterile atmosphere, either dry or after having been submerged in a sterile liquid. If a liquid pack is resorted to, the liquid which usually consists of a brine solution, must also have been previously thoroughly sterilized, and the speed and effectiveness of sterilization thereof, may obviously likewise be greatly enhanced by heat treating the liquid alone in the form of a relatively thin film or layer subjected to a suitable source of heat. It is to be noted that the heat treatment of the liquid does not demand the same care as that of the solids, since the former will stand more abuse and is not subject to damage due to sudden and excessive heating, as is the case with the solid granules.

It is a more specific object of the present invention to provide an improved method of effectively and rapidly sterilizing food products possessing the above described characteristics, and of subsequently conditioning and packing the same in the presence of liquid and under sterile conditions, in order to permanently preserve the commodity.

It has heretofore been proposed to effect sterilization of commodities having characteristics similar to those of green peas, by gradually subjecting the material either in bulk or in segregated batches, to gradually increasing temperature and pressure, until complete destruction of all bacteria has been effected, and to thereafter gradually reduce the temperature of the treated product to normal. In carrying out such prior process, the granular materials are mixed with liquid, and the purpose of applying the heat gradually in increasing and subsequently decreasing increments, is to prevent destruction of the granules due to sudden release of the external pressure and consequent bursting thereof by the internal pressure. It is contemplated under the present improvement, to treat the granular material alone in this same manner, in order to avoid possible destruction of the granules due to sudden release of the pressure. But by heating the granular material alone in the absence of liquid, the heat will obviously penetrate each granule of the mass, at a considerably more rapid rate than when liquid is present, thereby materially shortening the time of treatment necessary in order to attain the same results as with the prior process referred to. This is true whether the granular material is treated in bulk in the form of a thick or thin layer, or in the form of relatively small batches placed in the final containers or cans. The present improvement is therefore not limited to treatment of the dry product in any particular quantities.

In accordance with the prior process previously referred to, it has also been proposed to treat the fluent mixture of granular material and liquid, in the form of a constantly advancing thin filmlike sheet or layer, in order to enhance the rapidity of heat penetration and consequent sterilization. In accordance with the present improvement, this advantageous step is also utilized in effecting sterilization of the liquid such as brine, syrup or the like, alone. The liquid upon having been thus effectively sterilized, is permitted to cool either naturally or by the application of artificial cooling medium, either to atmospheric temperature or below as desired.

The granular material after having been sterilized in dry condition, should not be cooled to atmospheric temperature nor exposed directly to the atmosphere, prior to the addition of the sterile liquid. In the case of green peas where the final sterilizing temperature required would be somewhat above 212° F., the cooling of the sterilized granules prior to the addition of the brine, should not be permitted to drop below about 100° F. The relatively cool and sterile brine upon being admitted to the voids of the sterile mass of peas, quickly cools the individual granules without in any manner injuring the same. The sterile mixture thus produced should be subsequently packed and hermetically sealed in the containers or cans under absolutely sterile conditions, thereby insuring permanent preservation of the commodity.

When the material is capable of being treated in bulk, the sterilized cooling liquid may be admitted to a constantly advancing relatively thin stream of the sterilized granular material, after the latter has been initially cooled to the desired extend. The mixture may be subsequently segregated into measured batches and packed in a well known manner. When treating the granular material in batch form, the substance may be sterilized directly in the containers or cans while being advanced in succession through segregated successive heating chambers, each of the cans being supplied with an accurately premeasured quantity of peas or the like. After the desired degree of cooling has been effected, following the sterilization, accurately measured quantities of the sterilized cooling liquid may be deposited in each of the successive containers, to thereby effect final cooling of each batch and to place the same in condition for final closing under sterile conditions such as a steam bath.

From the foregoing detailed description, it should be apparent that green peas and other commodities having similar characteristics, may be rapidly and effectively sterilized and subsequently permanently preserved, in accordance with the present improved method, without danger of deteriorating the quality of the granular material. The improved process will obviously permit effective treatment of the product at a sufficiently rapid rate to keep pace with the high speed fillers and closing machines, and insures thorough sterilization of all portions of each batch of mixture treated.

While the present improved process is undoubtedly applicable with advantageous results, to the treatment of various kinds of vegetables and fruits, it is known that there are certain classes of commodities which cannot be treated in accordance therewith, and the treatment of these latter classes forms the subject of another application S. N. 371,304, filed June 15, 1929.

It should be understood that it is not contemplated to limit the present invention to the exact steps of the method specifically described herein by way of illustration, for various modifications within the scope of the appended claims may occur to persons skilled in the art.

It is claimed and desired to secure by Letters Patent:—

1. The process of sterilizing, which comprises, heating granular solids alone to sterilizing temperature, and cooling the sterilized solids by admitting sterile liquid to the voids thereof.

2. The process of sterilizing, which comprises, heating solids alone to sterilizing temperature, and cooling the sterilized solids by immersing the same in a sterile liquid.

3. The process of sterilizing, which comprises, heating solids alone to sterilizing temperature, partially cooling the sterilized solids alone, and finally completing the cooling operation by admitting sterile liquid to the voids of the solids.

4. The process of sterilizing, which comprises, heating solids alone to sterilizing temperature, partially reducing the temperature of the sterilized solids alone, and finally cooling the solids by immersing the same in a sterile liquid.

5. The process of sterilizing, which comprises, heating successive batches of granular solids alone to sterilizing temperature, partially cooling the sterilized batches in succession, and finally completing the cooling operation by admitting sterile liquid to the voids of the successive partially cooled batches.

6. The process of sterilizing, which comprises, heating batches of granular solids alone in succession to at least the sterilizing temperature thereof, gradually partially reducing the temperature of the sterilized batches in succession, and finally cooling the solids by immersing the successive batches in batches of sterile liquid.

7. The process of sterilizing, which comprises, heating solids alone to sterilizing temperature, cooling the sterilized solids by immersing the same in a sterile liquid, and hermetically sealing the mixture under sterile conditions.

8. The process of sterilizing, which comprises, heating solids alone to sterilizing temperature, partially cooling the sterilized solids alone, completing the cooling operation with the aid of a relatively cool liquid, and finally packing the sterile product while confined in a sterile atmosphere.

9. The process of sterilizing, which comprises, sterilizing granular material alone, cooling the sterilized material by mixing relatively cool sterile liquid therewith, and finally hermetically sealing the mixture while confined in a sterile atmosphere.

10. The process of sterilizing, which comprises, heating granular material alone to a temperature above 212° F., cooling the granular material alone to approximately 100° F., further cooling the material by mixing relatively cool sterile liquid therewith, and finally sealing the mixture in containers in a sterile atmosphere.

In testimony whereof, the signature of the inventor is affixed hereto.

OSWALD H. HANSEN.